US006500778B1

(12) United States Patent
Maeda et al.

(10) Patent No.: US 6,500,778 B1
(45) Date of Patent: Dec. 31, 2002

(54) GLASS SUBSTRATE FOR A DISPLAY

(75) Inventors: Kei Maeda, Yokohama (JP); Yasumasa Nakao, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 37 days.

(21) Appl. No.: 09/644,267

(22) Filed: Aug. 23, 2000

(30) Foreign Application Priority Data

Aug. 24, 1999 (JP) ............................................. 11-237547

(51) Int. Cl.⁷ ............................. C03C 3/04; C03C 3/091
(52) U.S. Cl. ............................................. 501/66; 501/53
(58) Field of Search ................. 501/66, 11, 53

(56) References Cited

U.S. PATENT DOCUMENTS

| 5,599,754 | A | 2/1997 | Maeda et al. |
| 5,631,195 | A | 5/1997 | Yanagisawa et al. |
| 5,721,181 | A | 2/1998 | Sehgal et al. |
| 5,741,745 | A | 4/1998 | Sehgal et al. |
| 5,780,373 | A | 7/1998 | Yanagisawa et al. |
| 5,858,897 | A | 1/1999 | Maeda et al. |
| 5,888,917 | A | 3/1999 | Kawaguchi et al. |
| 5,908,794 | A | 6/1999 | Maeda et al. |
| 6,268,304 | B1 * | 7/2001 | Maeda et al. .................. 501/65 |

* cited by examiner

*Primary Examiner*—Christopher A. Fiorilla
(74) *Attorney, Agent, or Firm*—Oblon, Spivak, McClelland, Maier & Neustadt, P.C.

(57) ABSTRACT

A glass substrate for a display, which has a strain point of at least 550° C., an average linear expansion coefficient of from $65 \times 10^{-7}$ to $100 \times 10^{-7}$/°C. within a range of from 50 to 350° C. and a ratio $K_{IC}/d$ of at least 280 Pa·kg·m$^{7/2}$ where $K_{IC}$ is the fracture toughness and d is the density.

3 Claims, No Drawings

GLASS SUBSTRATE FOR A DISPLAY

BACKGROUND OF THE INVENTION

1. Field of the Invention

The present invention relates to a glass substrate for a display which is particularly useful as a substrate for a flat panel display such as a plasma display panel (PDP) or a field emission display (FED).

2. Discussion of Background

In recent years, a flat panel display, particularly PDP which is one type of thin flat plate type gas discharge display panels, has attracted an attention and has been actively developed. PDP has a cell constituted and defined by a front glass substrate, a rear glass substrate and partition walls, so that plasma discharge is generated in the cell, whereby a phosphor layer on an inner wall of the cell will emit light to form an image.

For the front glass substrate and the rear glass substrate for PDP, a glass having a strain point higher than the strain point of soda lime silica glass, has been employed in order to minimize deformation of the glass substrate during the heat treatment step in the process for the production of PDP.

However, the conventional glass substrate having a high strain point has had a problem that it is susceptible to fracture in the process for the production, as compared with the soda lime silica glass substrate.

SUMMARY OF THE INVENTION

It is an object of the present invention to provide a glass substrate for a display, whereby this problem can be solved.

The present invention provides a glass substrate for display, which has a strain point of at least 550° C., an average linear expansion coefficient of from $65 \times 10^{-7}$ to $100 \times 10^{-7}$/°C. within a range of from 50 to 350° C. and a ratio $K_{IC}/d$ of at least 280 Pa·kg·m$^{7/2}$ where $K_{IC}$ is the fracture toughness and d is the density.

The present inventors have analyzed in detail the substrates fractured during the process for the production of PDP. As a result, with most of the fractured substrates, impact impressions have been observed which are considered to have formed when the edge portions have received a shock during the handling in an upstream step in the process for the production of PDP. It has been found that with such impact impressions serving as fracture origins, the substrates have been fractured by e.g. a thermal stress in the process for the production of PDP. Accordingly, it is considered possible to solve the problem of fracture of the substrate in the process for the production of PDP by employing a substrate whereby such impact impressions will scarcely form.

The present inventors have investigated the relation between the probability for formation of the above-mentioned impact impressions and the physical properties of the glass substrate, and as a result, have found that the probability for formation of the impact impressions depends on the ratio $K_{IC}/d$ where the $K_{IC}$ is the fracture toughness of the glass and d is the density. Namely, such a probability decreases as $K_{IC}/d$ increases.

The reason is considered to be explained as follows.

$K_{IC}$ is a quantity representing the resistance against fracture of the glass and shows the degree of resistance against the same impact force.

On the other hand, the impact force exerted to a substrate during the handling of the substrate, is represented by the impulse given to the substrate i.e. the change of momentum. The momentum is given by mass ×velocity. Accordingly, the impulse exerted to a substrate having a certain velocity change created, is determined by its mass. For example, the impact force given to a substrate of the same size dropped from the same height, is greater as the specific gravity of the substrate is larger.

On the basis of the foregoing discovery, the present inventors have arrived at the present invention.

DETAILED DESCRIPTION OF THE PREFERRED EMBODIMENTS

The strain point of the glass substrate for a display of the present invention (hereinafter referred to imply as the glass substrate of the present invention) is at least 550° C. If it is less than 550° C., deformation during the heat treatment step tends to be large. It is preferably at least 560° C.

The average linear expansion coefficient of the glass substrate of the present invention within a range of from 50 to 350° C. is from $65 \times 10^{-7}$ to $100 \times 10^{-7}$/°C. If it is less than $65 \times 10^{-7}$/°C. or more than $100 \times 10^{-7}$/°C., matching in the expansion coefficient with the material which is commonly used for the production of a display (such as glass frit) tends to be difficult. It is preferably from $75 \times 10^{-7}$ to $95 \times 10^{-7}$/°C., more preferably from $80 \times 10^{-7}$ to $90 \times 10^{-7}$/°C. Hereinafter, the average linear expansion coefficient within a range of from 50 to 350° C. will be referred to simply as an expansion coefficient.

In the glass substrate of the present invention, the ratio $K_{IC}/d$ where $K_{IC}$ is the fracture toughness and d is the density, is at least 280 Pa·kg·m$^{7/2}$. If it is less than 280 Pa·kg·m$^{7/2}$, the glass substrate tends to be susceptible to fracture. It is preferably at least 290 Pa·kg·m$^{7/2}$.

The glass substrate of the present invention is preferably one prepared by a float method which is capable of producing plate glass of high quality in a large amount.

The glass substrate of the present invention preferably consists essentially of:

| | |
|---|---|
| $SiO_2$ | 45 to 70 wt %, |
| $Al_2O_3$ | 2 to 20 wt %, |
| $B_2O_3$ | 0 to 6 wt %, |
| MgO | 1 to 10 wt %, |
| CaO | 1 to 10 wt %, |
| SrO | 0 to 9 wt %, |
| BaO | 0 to 9 wt %, |
| MgO + CaO + SrO + BaO | 10 to 25 wt %, |
| ZnO | 0 to 5 wt %, |
| $Na_2O + K_2O$ | 5 to 15 wt %, |
| $Li_2O$ | 0 to 2 wt %, and |
| $ZrO_2$ | 0 to 10 wt %. |

More preferably, the glass substrate of the present invention consists essentially of:

| | |
|---|---|
| $SiO_2$ | 45 to 65 wt %, |
| $Al_2O_3$ | 6 to 20 wt %, |
| $B_2O_3$ | 0.5 to 6 wt %, |
| MgO | 2 to 5 wt %, |
| CaO | 1 to 10 wt %, |
| SrO | 0 to 6.5 wt %, |
| BaO | 0 to 2 wt %, |
| MgO + CaO + SrO + BaO | 10 to 17 wt %, |
| ZnO | 0 to 5 wt %, |

-continued

| | |
|---|---|
| Na$_2$O + K$_2$O | 5 to 15 wt %, |
| Li$_2$O | 0 to 2 wt %, and |
| ZrO$_2$ | 0 to 7 wt %. |

The reasons for defining the above compositions will be described below, wherein wt % will be represented simply as %.

SiO$_2$ is essential as a network former. If it is less than 45%, the heat resistance or the chemical durability tends to deteriorate. It is preferably at least 51%. If it exceeds 70%, K$_{IC}$/d tends to be too small. It is preferably at most 65%, more preferably at most 60%, particularly preferably at most 55%.

Al$_2$O$_3$ is essential as a component to increase the strain point. If it is less than 2%, the strain point tends to be too low. It is preferably at least 6%, more preferably at least 10%. If it exceeds 20%, the viscosity of the molten glass tends to be too high, whereby forming, particularly float forming, tends to be difficult. It is preferably at most 16%.

B$_2$O$_3$ is not essential, but may be incorporated up to 6% to increase K$_{IC}$/d or to lower the viscosity of the molten glass at the time of melting the glass. If it exceeds 6%, the strain point tends to be too low. It is more preferably at most 5%. When B$_2$O$_3$ is incorporated, the content is preferably at least 0.5%, more preferably at least 1%, particularly preferably at least 2%.

MgO is essential as a component to increase K$_{IC}$/d and to lower the viscosity of the molten glass at the time of melting the glass. If it is less than 1%, K$_{IC}$/d tends to be too small, or the viscosity of the molten glass at the time of melting tends to be too large. It is preferably at least 2%, more preferably at least 3%. If it exceeds 10%, devitrification is likely to result. It is preferably at most 5%, more preferably at most 4%.

CaO is essential as a component to lower the viscosity of the molten glass at the time of melting the glass. If it is less than 1%, the viscosity of the molten glass at the time of melting tends to be too high. It is preferably at least 5%. If it exceeds 10%, devitrification is likely to result. It is preferably at most 9%.

SrO is not essential, but may be incorporated up to 9% to lower the viscosity of the molten glass at the time of melting the glass. If it exceeds 9%, K$_{IC}$/d tends to be small. It is preferably at most 6.5%, more preferably at most 4%.

BaO is not essential, but may be incorporated up to 9% to lower the viscosity of the molten glass at the time of melting the glass. If it exceeds 9%, K$_{IC}$/d tends to be small. It is preferably at most 4%, more preferably at most 2.5%, particularly preferably at most 2%. It is preferred not to contain BaO, so long as there will be no problem in the viscosity of the molten glass at the time of melting the glass.

If the total content of MgO, CaO, SrO and BaO is less than 10%, the viscosity of the molten glass at the time of melting tends to be too high. Preferably, it is at most 12%. If it exceeds 25%, K$_{IC}$/d tends to be too small. It is preferably at most 17%, more preferably at most 15%.

ZnO is not essential, but may be incorporated up to 5% to lower the viscosity of the molten glass at the time of melting the glass. If it exceeds 5%, the glass is likely to be reduced during float forming, thus leading to defects of the product.

Na$_2$O and K$_2$O are components to lower the viscosity of the molten glass at the time of melting the glass, and at least one of them must be contained. If the total content of Na$_2$O and K$_2$O is less than 5%, the viscosity of the molten glass at the time of melting tends to be too high. It is preferably at least 7%, more preferably at least 9%. If it exceeds 15%, Na ions and/or K ions are likely to migrate to the electrodes formed on the glass substrate, whereby the electrode characteristics tend to deteriorate. It is preferably at most 13%. The content of Na$_2$O is preferably at most 7%. If it exceeds 7%, the electrical insulating property is likely to deteriorate.

Li$_2$O is not essential, but may be incorporated up to 2% to lower the viscosity of the molten glass at the time of melting the glass. If it exceeds 2%, the strain point is likely to be low.

ZrO$_2$ is not essential, but may be incorporated up to 10% to increase the strain point or to increase K$_{IC}$/d. If it exceeds 10%, the density tends to be too large, and K$_{IC}$/d tends to be too small. It is preferably at most 7%, more preferably at most 5%, particularly preferably at most 3%.

A glass substrate according to a preferred embodiment of the present invention consists essentially of the above components. However, other components may be incorporated in a total amount of up to 5% within a range not impair the purpose of the present invention. For example, SO$_3$, F, As$_2$O$_3$, Sb$_2$O$_3$, etc. may be incorporated in a total amount of up to 1% to improve the melting property, refining or forming property of the glass. Further, TiO$_2$ and CeO$_2$ may be incorporated in an amount of 2% each and in a total amount of up to 2%, for example, to prevent browning due to electron rays in PDP. Further, Fe$_2$O$_3$, NiO, CoO, etc. may be incorporated in a total amount of up to 1% to color the glass.

The glass substrate of the present invention can be produced, for example, as follows. Namely, commonly employed starting materials are mixed to have a desired composition, and the mixture is heated and melted in a melting furnace at a temperature of from 1,500 to 1,600° C. Bubbling, addition of a refining agent or stirring is carried out to homogenize the glass, and the glass is formed into a predetermined thickness by a conventional float method, then annealed and cut into a predetermined size to obtain a glass substrate.

The glass substrate of the present invention is useful as a substrate for a flat panel display such as PDP or FED.

Now, the present invention will be described in further detail with reference to Examples. However, it should be understood that the present invention is by no means restricted to such specific Examples.

EXAMPLES 1 to 4

Starting materials for the respective components were mixed to have the compositions shown by wt % in the rows for from SiO$_2$ to ZrO$_2$ in Table 1. Such a mixed material was continuously introduced and melted in a melting furnace and formed into a plate by a float method to obtain a float glass having a thickness of 2.8 mm. This float glass was cut to obtain a glass substrate of 65 cm×100 cm.

With respect to the glass substrates of Examples 1 to 4, the strain points (unit: °C.), the expansion coefficients (unit: 10$^{-7}$/°C.), the fracture toughness K$_{IC}$ (unit: MPa·m$^{1/2}$) and the densities d (unit: g/cm$^3$) were measured by the methods which will be described hereinafter, and K$_{IC}$/d (unit: Pa·kg·m$^{7/2}$) was calculated from K$_{IC}$ and d. The results are shown in Table 1.

Strain point: Measured by a method prescribed in JIS R3103.

Expansion coefficient: An average linear expansion coefficient within a range of from 50 to 350° C. was measured by means of a differential thermal expansion meter.

Fracture toughness: Measured by a Chevron notch method as disclosed, for example, in Int. J. Fracture, 16, 137 (1980).

Density: Measured by an Archimedes method with respect to a glass of about 30 g containing no bubbles.

TABLE 1

| Examples | 1 | 2 | 3 | 4 |
|---|---|---|---|---|
| $SiO_2$ | 51.4 | 57.2 | 57.6 | 71.2 |
| $Al_2O_3$ | 15.0 | 3.0 | 7.0 | 1.8 |
| $B_2O_3$ | 4.4 | 0 | 0 | 0 |
| MgO | 3.6 | 1.5 | 2.0 | 4.0 |
| CaO | 8.0 | 8.5 | 5.0 | 9.0 |
| SrO | 2.3 | 6.0 | 7.0 | 0 |
| BaO | 0 | 2.0 | 8.0 | 0 |
| MgO + CaO + SrO + BaO | 13.9 | 18.0 | 22.0 | 13.0 |
| $Na_2O$ | 4.7 | 4.8 | 4.1 | 13.0 |
| $K_2O$ | 7.8 | 8.0 | 6.3 | 1.0 |
| $Na_2O + K_2O$ | 12.5 | 12.8 | 10.4 | 14.0 |
| $ZrO_2$ | 2.8 | 9.0 | 3.0 | 0 |
| Strain point | 580 | 609 | 570 | 511 |
| Expansion coefficient | 83 | 84 | 83 | 85 |
| Fracture toughness $K_{IC}$ | 0.78 | 0.74 | 0.65 | 0.75 |
| Density d | 2.59 | 2.785 | 2.77 | 2.50 |
| $K_{IC}$/d | 300 | 265 | 230 | 300 |

Example 1 represents a working Example of the present invention, and Examples 2 to 4 are Comparative Examples. Further, Example 4 represents conventional soda lime silica glass.

With respect to 100 glass substrates of each of Examples 1 to 4, edges were chamfered, and a thin film of ITO (tin-doped indium oxide) was formed on each glass substrate by means of a sputtering film-forming apparatus. The maximum temperature in this sputtering film-forming process was 300° C.

With respect to the glass substrates of Examples 1 and 4, it was possible to form ITO thin films on the glass substrates without breakage of any one of them.

With respect to the glass substrates of Example 2, seven substrates fractured, and with respect to the glass substrates of Example 3, ten substrates fractured, each from an edge of the glass substrate. The fractured surface of the fractured glass substrate was investigated, whereby it was found that in each case, the fracture stress was not higher than 150 kgf/cm$^2$ from the size of the mirror radius impressed on the fractured surface, and thus the substrate fractured by a stress far lower than the strength of a glass substrate which was subjected only to common chamfering. This indicates that in a step subsequent to the chamfering, substantial flaws formed on the edge of the glass substrate, and the flaws served as fracture origins. $K_{IC}$/d of each of Examples 2 and 3 was less than 280 Pa·kg·m$^{7/2}$, whereby impact impressions were likely to form, and it is believed that such impact impressions became flaws for fracture origins, whereby the glass substrate fractured.

The strain point of the glass substrate of Example 4 is low, such a glass substrate is likely to deform when glass frit coated on the glass substrate is baked, for example, at 500° C. in the process for producing a display device.

As described in the foregoing, by employing the glass substrate of the present invention, it is possible to reduce the problem of fracture of a glass substrate in the process for producing a display device, and thermal deformation of the glass substrate can be avoided, whereby the efficiency for the production of a display device can be improved.

The entire disclosure of Japanese Patent Application No. 11-237547 filed on Aug. 24, 1999 including specification, claims, drawings and summary are incorporated herein by reference in its entirety.

What is claimed is:

1. A glass substrate for a display, which has a strain point of at least 550° C., an average linear expansion coefficient of from 65×10$^{-7}$ to 100×10$^{-7}$/°C. within a range of from 50 to 350° C. and a ratio $K_{IC}$/d of at least 280 Pa·kg·m$^{7/2}$ wherein $K_{IC}$ is the fracture toughness and d is the density, which consistent essentially of

| | |
|---|---|
| $SiO_2$ | 45 to 70 wt %, |
| $Al_2O_3$ | 2 to 20 wt %, |
| $B_2O_3$ | 0 to 6 wt %, |
| MgO | 1 to 10 wt %, |
| CaO | 1 to 10 wt %, |
| SrO | 0 to 9 wt %, |
| BaO | 0 to 9 wt %, |
| MgO + CaO + SrO + BaO | 10 to 25 wt %, |
| ZnO | 0 to 5 wt %, |
| $Na_2O + K_2O$ | 5 to 15 wt %, |
| $Li_2O$ | 0 to 2 wt %, and |
| $ZrO_2$ | 0 to 10 wt %. |

2. The glass substrate for a display according to claim 1, which has an average linear expansion coefficient of from 75×10$^{-7}$ to 95×10$^{-7}$/°C.

3. The glass substrate for a display according to claim 1, which consists essentially of:

| | |
|---|---|
| $SiO_2$ | 45 to 65 wt %, |
| $Al_2O_3$ | 6 to 20 wt %, |
| $B_2O_3$ | 0.5 to 6 wt %, |
| MgO | 2 to 5 wt %, |
| CaO | 1 to 10 wt %, |
| SrO | 0 to 6.5 wt %, |
| BaO | 0 to 2 wt %, |
| MgO + CaO + SrO + BaO | 10 to 17 wt %, |
| ZnO | 0 to 5 wt %, |
| $Na_2O + K_2O$ | 5 to 15 wt %, |
| $Li_2O$ | 0 to 2 wt %, and |
| $ZrO_2$ | 0 to 7 wt %. |

* * * * *